United States Patent
Senapati et al.

(10) Patent No.: US 10,664,228 B1
(45) Date of Patent: May 26, 2020

(54) METHOD AND SYSTEM FOR AUTOMATICALLY CONTROLLING AUDIO OUTPUT OF A TELEVISION DEVICE BASED ON AMBIENT NOISE

(71) Applicant: TP Vision Europe B.V., Amsterdam (NL)

(72) Inventors: Gyana Ranjan Senapati, Karnataka (IN); Anirudha Ramdas Zade, Karnataka (IN)

(73) Assignee: TP VISION EUROPE B.V., Amsterdam (NL)

( * ) Notice: Subject to any disclaimer, the term of this patent is extended or adjusted under 35 U.S.C. 154(b) by 0 days.

(21) Appl. No.: 16/533,536

(22) Filed: Aug. 6, 2019

(30) Foreign Application Priority Data

Jul. 23, 2019 (EP) .................................. 19187905

(51) Int. Cl.
| | |
|---|---|
| *H04N 5/60* | (2006.01) |
| *G06F 3/16* | (2006.01) |
| *H04N 5/44* | (2011.01) |
| *G06T 7/50* | (2017.01) |
| *H04N 5/225* | (2006.01) |

(52) U.S. Cl.
CPC ................ *G06F 3/165* (2013.01); *G06T 7/50* (2017.01); *H04N 5/2253* (2013.01); *H04N 5/4403* (2013.01); *H04N 5/60* (2013.01); *G06T 2207/10028* (2013.01); *G06T 2207/30196* (2013.01); *H04N 2005/4428* (2013.01); *H04N 2005/4444* (2013.01)

(58) Field of Classification Search
CPC ............................. H04N 21/42202; H04N 5/60
See application file for complete search history.

(56) References Cited

U.S. PATENT DOCUMENTS

| | | | | |
|---|---|---|---|---|
| 5,199,080 A | * | 3/1993 | Kimura ................. | H03J 1/0025 381/110 |
| 7,415,120 B1 | * | 8/2008 | Vaudrey ................... | H03G 3/32 381/109 |
| 8,274,611 B2 | * | 9/2012 | DeMartin ................ | H04N 5/60 348/569 |

(Continued)

FOREIGN PATENT DOCUMENTS

WO 2013014886 A1 1/2013

OTHER PUBLICATIONS

Search Report issued to European counterpart application No. 19187905.5 by the EPO dated Feb. 5, 2020 (9 pages).

*Primary Examiner* — Paulos M Natnael

(74) *Attorney, Agent, or Firm* — Hamre, Schumann, Mueller & Larson, P.C.

(57) ABSTRACT

A method for automatically controlling audio output of a television system that includes a television device is provided. The method includes, by a processor of the television device: in response to receipt of a source signal, controlling an audio output unit to output an audio signal extracted from the source signal; activating an ambient sound monitoring unit to obtain ambient sound data; determining based on at least the ambient sound data, whether the audio output needs to be adjusted; and when it is determined that the audio output needs to be adjusted, adjusting the audio signal based on at least the ambient sound data to generate an adjusted audio signal, and controlling the audio output unit to output the adjusted audio signal.

13 Claims, 3 Drawing Sheets

(56) References Cited

U.S. PATENT DOCUMENTS

| | | | | |
|---|---|---|---|---|
| 8,797,465 | B2* | 8/2014 | Hardacker | H04N 5/44582 |
| | | | | 348/734 |
| 9,608,584 | B2* | 3/2017 | Seefeldt | H03G 9/14 |
| 2008/0278635 | A1 | 11/2008 | Hardacker et al. | |
| 2009/0245539 | A1* | 10/2009 | Vaudrey | H03G 7/002 |
| | | | | 381/109 |
| 2010/0146445 | A1* | 6/2010 | Kraut | H04N 5/60 |
| | | | | 715/821 |
| 2012/0019726 | A1* | 1/2012 | Arora | H04N 21/42202 |
| | | | | 348/602 |
| 2013/0279699 | A1* | 10/2013 | Suzuki | H04R 5/04 |
| | | | | 381/2 |
| 2014/0314261 | A1* | 10/2014 | Selig | H04R 25/50 |
| | | | | 381/314 |
| 2015/0373474 | A1* | 12/2015 | Kraft | H04R 1/1083 |
| | | | | 381/17 |
| 2015/0382106 | A1* | 12/2015 | Kraft | H04R 1/1083 |
| | | | | 381/119 |

* cited by examiner

METHOD AND SYSTEM FOR AUTOMATICALLY CONTROLLING AUDIO OUTPUT OF A TELEVISION DEVICE BASED ON AMBIENT NOISE

CROSS-REFERENCE TO RELATED APPLICATION

This application claims priority of European Patent Application No. 19187905.5, filed on Jul. 23, 2019.

FIELD

The disclosure relates to a method and a system for automatically controlling audio output of a television device based on ambient noise.

BACKGROUND

Typically, when a user is watching a program on a television device, ambient noise from, for example, nearby electric appliances indoors (e.g., an electric fan, a ventilator, an air conditioning equipment, a washing machine, a dish washer, etc.), or from outside of the room/house may be present and affect the user's experience of viewing. For example, it may be difficult to hear the dialogue in the program due to the presence of the ambient noise.

It is noted that in some cases, the ambient noise cannot be adjusted by the user, and thus the user may need to manually adjust an output volume of the television device in order to clearly hear the audio content of the program (e.g., the dialogue).

SUMMARY

One object of the disclosure is to provide a method for automatically controlling audio output based on ambient noise.

According to one embodiment of the disclosure, the method is for automatically controlling audio output of a television system that includes a television device. The television device is connected to an input signal source and includes a processor, an ambient sound monitoring unit, and an audio output unit. The method is implemented using the processor of the television device and includes the steps of:

in response to receipt of a source signal from the input signal source, controlling the audio output unit to output an audio signal extracted from the source signal;

activating the ambient sound monitoring unit so as to obtain ambient sound data;

determining, based on at least the ambient sound data, whether the audio output needs to be adjusted; and when it is determined that the audio output needs to be adjusted, adjusting the audio signal based on at least the ambient sound data to generate an adjusted audio signal, and controlling the audio output unit to output the adjusted audio signal.

Another object of the disclosure is to provide a system that is configured to implement the above-mentioned method.

According to one embodiment of the disclosure, the television system includes a television device that is connected to an input signal source and that includes a processor, an ambient sound monitoring unit, and an audio output unit. The processor is configured to:

in response to receipt of a source signal from the input signal source, control the audio output unit to output an audio signal extracted from the source signal;

activate the ambient sound monitoring unit so as to obtain ambient sound data;

determine, based on at least the ambient sound data, whether the audio output needs to be adjusted; and when it is determined that the audio output needs to be adjusted, adjust the audio signal based on at least the ambient sound data, to generate an adjusted audio signal, and control the audio output unit to output the adjusted audio signal.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
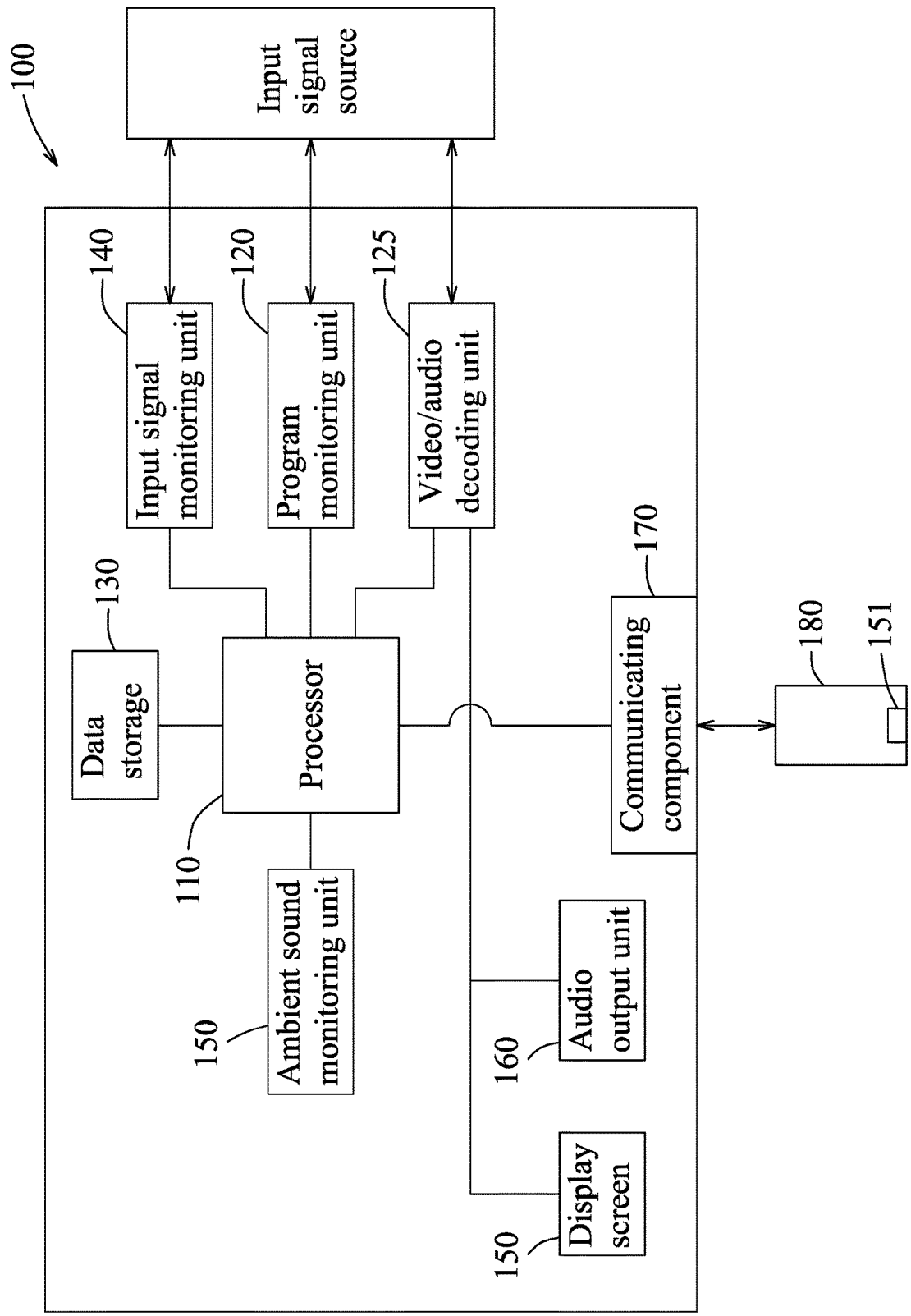
FIG. 1 is a block diagram illustrating a television system that includes a television device according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

FIG. 1 illustrates a television system that includes a television device 100 according to one embodiment of the disclosure. In this embodiment, the television device 100 includes a processor 110, a program monitoring unit 120, a video/audio decoding unit 125, a data storage 130, an input signal monitoring unit 140, an ambient sound monitoring unit 150, a display screen 155, an audio output unit 160 and a communicating component 170.

The processor 110 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), and/or the like.

The program monitoring unit 120 is electrically connected to the processor 110 and an input signal source. The input signal source provides a source signal that may be one of an over-the-air (OTA) television signal, a satellite television signal, a cable television signal, a media on demand (MOD) signal, etc. The source signal may be in the form of an analog signal or a digital signal, and includes an electronic program guide (EPG) containing program metadata regarding a program. In some embodiments, the input source signal may be in the form of a media file (e.g., a pre-recorded program) accessed from a built-in hard disk drive (HDD), an external storage connected to the processor 110 via a Universal Serial Bus (USB) interface, or a high definition multimedia interface (HDMI), and a viewer may select the media file for playback.

The video/audio decoding unit 125 may be embodied using a coder-decoder (codec) circuit, is electrically connected to the processor 110 and the input signal source. The video/audio decoding unit 125 is configured to receive the source signal from the input signal source, and is controlled by the processor 110 to perform a decoding operation on the source signal so as to obtain a video signal and an audio signal from the source signal.

The data storage 130 may be embodied using one or more of a hard disk, a solid-state drive (SSD) and other non-transitory storage medium, and stores at least one user profile and a set of software applications therein. The set of software applications may include an operating system (OS) to be executed by the processor 110.

The input signal monitoring unit 140 is connected to the input signal source for continuously determining an energy level of the source signal. It is noted that the energy level of the source signal of the program may be changing constantly throughout the entire span of the program. For example, in a segment of the program containing content related to a quiet environment, the energy level of the source signal may be low (i.e., a corresponding volume outputted is low). On the other hand, in another segment of the same program containing content related to loud activities, the energy level of the source signal may be relatively higher. As a result, a volume that is outputted during broadcast of the program may differ even though a volume setting of the television device 100 is kept constant. In some embodiments, the input signal monitoring unit 140 further calculates an average value of the energy level of the source signal that is measured over a predetermined time period (e.g., 10 seconds) for subsequent uses.

The ambient sound monitoring unit 150 may be embodied using a microphone set or a transducer set disposed on an outer case of the television device 100, and when activated, is capable of measuring ambient noise and obtaining ambient sound data associated with the ambient noise. The ambient sound data may include an energy level of the ambient noise.

The display screen 155 and the audio output unit 160 are electrically connected to the processor 110 and the video/audio decoding unit 125, and are controlled by the processor 110 to display the video signal and output the audio signal, respectively. For example, the audio output unit 160 is a speaker built in the television device 100. In some embodiments, the audio output unit 160 may be connected to the processor 110 using a wireless communication mechanism such as Wi-Fi, Bluetooth®, etc.

The audio output unit 160 is controlled to output the audio signal based on a current output setting which may be adjusted manually. The current output setting includes at least the volume setting that is related to a current output volume. In some cases, the television device 100 may be provided with more advanced sound control, including a sound equalizer (which may be embodied using physical circuitry or software programs constituting of filters) for adjusting energy levels of components of the audio signal at different frequency bands.

The communicating component 170 is electrically connected to the processor 110, and may include a short-range wireless communicating module supporting a short-range wireless communication network using a wireless technology of Bluetooth® and/or Wi-Fi, etc., and a mobile communicating module supporting telecommunication using Long-Term Evolution (LTE), the third generation (3G) and/or fourth generation (4G) of wireless mobile telecommunications technology, and/or the like.

Figure 2:
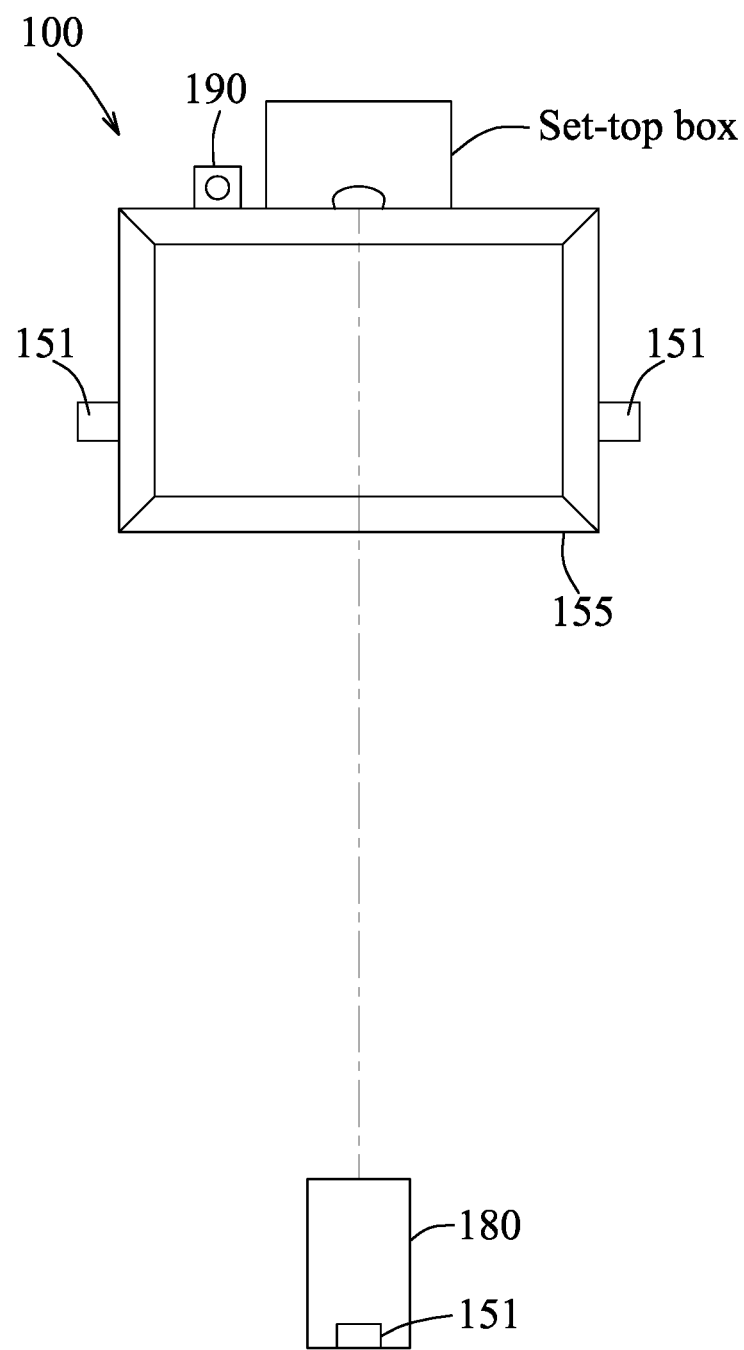
FIG. 2 is a schematic diagram illustrating the television system.

With further reference to FIG. 2, in this embodiment, the television system further includes a remote control 180, and the communicating component 170 is in communication with the remote control 180 for receiving a control signal therefrom. The control signal is for triggering the television device 100 to switch to an intended channel, to output the audio signal with an intended output volume, or to change one of a plurality of setting options of the television device 100. Additionally, the television device 100 may include a control panel disposed on the outer case of the television device 100. The control panel includes one or more buttons that enable the user to operate the television device 100 to switch to an intended channel, to output the audio signal with an intended output volume, or to change one of the setting options.

In some embodiments, the remote control 180 is also installed with a microphone or transducer to serve as the ambient sound monitoring unit 150. In some embodiments, the ambient sound monitoring unit 150 may include multiple microphones or transducers 151 that are disposed on the outer case of the television device 100 and on the remote control 180 (see FIG. 2).

It is noted that in some embodiments, some components of the television device 100 (such as the program monitoring unit 120, the video/audio decoding unit 125, the input signal monitoring unit 140) may be embodied using, for example, microprocessors that execute software instructions, firmware, etc.

In some embodiments, some components of the television device 100 (such as the processor 110, the program monitoring unit 120, the video/audio decoding unit 125, the data storage 130, the input signal monitoring unit 140, the ambient sound monitoring unit 150, and the communicating component 170) may be integrated into a set-top box (STB).

Figure 3:
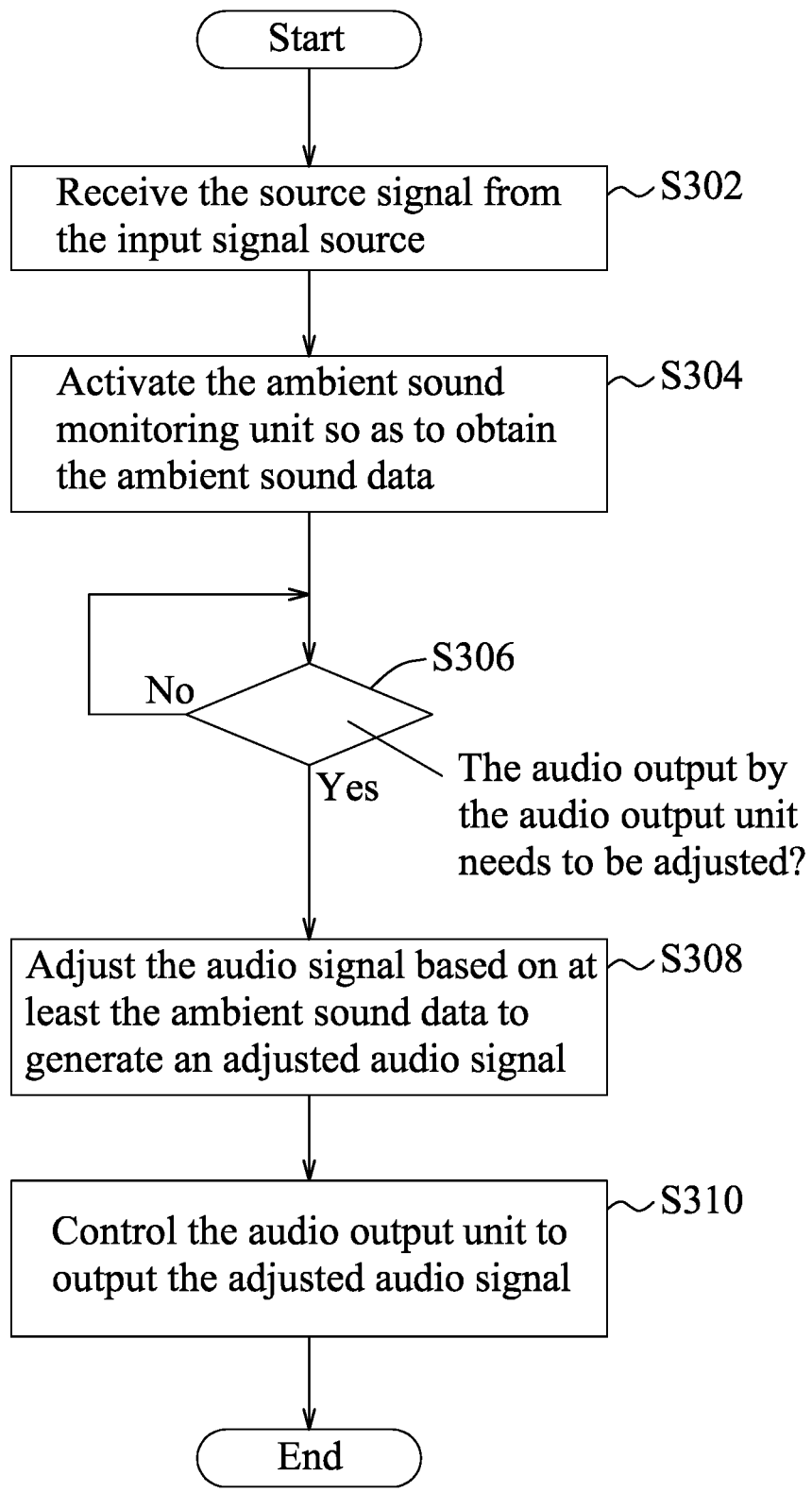
FIG. 3 is a flow chart illustrating steps of a method for automatically controlling audio output of the television device based on ambient noise according to one embodiment of the disclosure.

FIG. 3 is a flow chart illustrating steps of a method for automatically controlling audio output of a television device based on ambient noise according to one embodiment of the disclosure. The method may be implemented by the television device 100 as described in FIG. 1.

In use, when the television device 100 is powered on and is broadcasting a program, a user watching the program may operate the remote control 180 to enable the television device 100 to enter a noise adjustment mode. When the noise adjustment mode is activated, the method of FIG. 3 may be implemented. In some examples, the noise adjustment mode may be activated by default once the television device 100 is powered on. This setting of activation of the noise adjustment mode may be manually done by the user and stored by the processor 110 in the data storage 130 in advance.

In step 302, the television device 100 receives the source signal from the input signal source. In response to receipt of the source signal, the processor 110 controls the video/audio decoding unit 125 to perform the decoding operation on the source signal so as to obtain the video signal and the audio signal from the source signal. Then, the processor 110 controls the display screen 155 to display the video signal (i.e., visual content of the program), and controls the audio output unit 160 to output the audio signal (i.e., audio content of the program).

In step 304, the processor 110 activates the ambient sound monitoring unit 150 so as to obtain the ambient sound data. It is noted that step 304 may be implemented when the user operates the remote control 180 or the control panel of the television device 100 to activate the ambient sound monitoring unit 150. In some embodiments, the processor 110 automatically activates the ambient sound monitoring unit 150 to obtain the ambient sound data. In some examples, when the noise adjustment mode is activated as the television device 100 is powered on, step 304 is implemented simultaneously with step 302. In embodiments that the ambient sound monitoring unit 150 is mounted on the remote control 180, step 304 includes the processor 110 transmitting a signal to the remote control 180 through the communicating component 170 so as to instruct the remote control 180 to activate the ambient sound monitoring unit 150 that is mounted on the remote control 180.

As the ambient sound data is obtained, the processor 110 determines, in step 306, whether the audio output (i.e., outputting of the audio signal) by the audio output unit 160 needs to be adjusted.

Specifically, the determination is made by the processor 110 executing a corresponding one of the software applications stored in the data storage 130, based on at least the ambient sound data. The corresponding software application may include one or more algorithms for performing calculations based on inputs from other components of the television device 100, so as to make the determination.

For example, in this embodiment, the energy level of the ambient noise may be determined from the ambient sound data. The energy level of the ambient noise may then be compared with the average value of the energy level of the source signal, or compared with an output energy level of the audio signal that is being outputted by the output audio control unit 160. For example, the output energy level of the audio signal is related to the current output volume indicated by the current output setting. In one case, when it is determined that a ratio of the energy level of the ambient noise to the average value of the energy level of the source signal is larger than a predetermined threshold (e.g., 0.4), the algorithm may yield a result indicating that the energy level of the ambient noise is comparable to the energy level of the source signal, and therefore the ambient noise may become a distraction to the user watching the program broadcasted by the television device 100. In such a case, the output energy level of the audio signal should be increased to address the presence of the ambient noise. In another case, when an absolute value of the energy level of the ambient noise is higher than a noise threshold (e.g., 40 dB), the output energy level of the audio signal may be increased to address the presence of the ambient noise regardless of the energy level of the source signal.

In some embodiments, the algorithm may further take an estimated distance between the user and the television device 100 into consideration. In some cases, the estimated distance is obtained by estimating a distance between the television device 100 and the remote control 180. In other cases, the television system further includes a depth camera 190 that is mounted on the television device 100, and the estimated distance is obtained by the processor 110 controlling the depth camera 190 to capture an image of the user and estimating a depth to the user (i.e., the distance between the user and the television device 100) according to the image of the user.

In some embodiments, the algorithm may further take specific information regarding the program that is being broadcasted (e.g., a genre of the program) into consideration. The specific information may be obtained from the program metadata contained in the EPG received by the program monitoring unit 120.

Specifically, the processor 110 may acquire the genre of the program from the program metadata. Then, based on the genre of the program, the processor 110 may determine that one or more components of the audio signal should be adjusted. In some cases, the processor 110 may acquire a channel number associated with a channel that is broadcasting the program watched by the user. Using the channel number, the processor 110 may be able to "deduce" the genre of the program (for example, when the channel is a news channel, it may be deduced that the program is a news program).

In some embodiments, the algorithm may further take a user setting included in the user profile stored in the data storage 130 into consideration. For example, the user setting may include an age of the user and a sound preference of the user.

In use, when the user setting indicates that the user watching the program is at an advanced age (e.g., older than 65 years), the noise threshold used to make the determination may be lowered (e.g., to 30 dB). Furthermore, the processor 110 may access the sound preference of the user profile stored in the data storage 130, and determine whether the audio output needs to be adjusted further based on the sound preference (e.g., the sound preference may indicate that the user intends to listen to the audio more clearly, and as a result, the predetermined threshold used to make the determination may be lowered (e.g., 0.3)).

It is noted that in various embodiments, the determination in step 306 may be done with any combination of the above aspects as described above being taken into consideration. That is to say, in addition to the energy level of the ambient noise, the processor 110 may for example make the determination further based on a combination of the energy level of the source signal, the current output setting, the specific information regarding the program that is being broadcasted, and the user setting of the user profile.

When it is determined that the audio output needs to be adjusted, the flow proceeds to step 308. Otherwise, the flow goes back to step 306.

In step 308, the processor 110 adjusts the audio signal based on at least the ambient sound data to generate an adjusted audio signal.

Specifically, when it is determined in step 306 that the energy level of the ambient noise included in the ambient sound data is or has become too high (in an absolute term or in comparison with the output energy level of the original audio signal), the processor 110 may determine that the original audio signal should be outputted with a higher intensity (i.e., louder).

In such a case, the processor 110 may calculate an intended intensity, and adjust the original audio signal to have the intended intensity (e.g., to adjust an overall volume of the original audio signal). For example, the intended intensity may be positively related to the energy level of the ambient noise. In one case, as the energy level of the ambient noise increases by 1 dB, the intensity of the original audio signal may correspondingly increase by a fixed proportion (e.g., 50% of the energy level of the ambient noise).

In some examples where the sound equalizer is provided, the processor 110 may divide the ambient sound data into different components in various frequency bands, divide the audio signal into different components in the various frequency bands, and calculate intended intensities respectively for components of the audio signal in the various frequency bands. For example, each of the ambient sound data and the audio signal may be divided into a low frequency band component (also known as a "bass" sound), a high frequency band component (also known as a "treble" sound), or other additional frequency band components.

In such a case, the processor 110 may adjust the components of the audio signal to have the intended intensities (e.g., to adjust a volume of the bass sound of the audio signal, a volume of the treble sound of the audio signal, or at least one parameter used in a filter included in the sound equalizer). When one of the components of the audio signal increases in intensity, that component of the audio signal may be more audible to the user.

In some cases when the video/audio decoding unit 125 is provided with additional features (such as dialog enhancement, background sound enhancement, etc.), the audio signal may be divided into different components such as a dialog component, a soundtrack component, etc.

In such a case, the processor 110 may further calculate the adjusted audio signal according to the program metadata. In one example, when it is determined that, from the program metadata (e.g., the genre of the program), the broadcasted program is a dialog-heavy program (e.g., a news program, a drama series, etc.), the processor 110 may be configured to determine whether a condition for dialog enhancement (e.g., whether the energy level of the ambient noise is or has become close to the energy level of the dialog component) has been met. The condition for dialog enhancement may indicate that the dialog component of the audio signal should be enhanced. As such, when it is determined that the condition for dialog enhancement has been met, in adjusting the audio signal, the processor 110 may adjust the dialog component to have a higher energy level.

In another example, when it is determined from the program metadata that the broadcasted program is more oriented toward background sound (e.g., a music program, an action movie, etc.), the processor 110 may be configured to determine whether a condition for background sound enhancement has been met. When it is determined that the condition for background sound enhancement has been met, in adjusting the audio signal, the processor 110 may adjust the background sound component to have a higher energy level.

It is noted that in adjusting the audio signal, the processor 110 may also take additional aspects into consideration. For example, the sound preference of the user may indicate how one or more component(s) of the audio signal should be adjusted (e.g., the user prefers to have the bass sound enhanced).

In some embodiment, the operation of adjusting the audio signal includes generating a noise cancellation signal based on the ambient sound data, and combining the noise cancellation signal and the audio signal for generating the adjusted audio signal. The noise cancellation signal may be generated using an active noise control (ANC) technique in the field of digital signal processing.

In step 310, the processor 110 controls the audio output unit 160 to output the adjusted audio signal. In such a manner, the audio output may be adjusted so as to enhance user experience of the sound of the program in the presence of the ambient noise.

It is noted that after step 308 is implemented for a predetermined time period (e.g., 1 minute), the flow may go back to step 306 to determine whether the ambient noise is still present.

To sum up, the embodiments of the disclosure provide a method and a television system that are configured to automatically adjust output of an audio signal based on the presence of ambient noise. In embodiments, based on various additional aspects, the audio signal may be further adjusted to provide a even better experience for the user watching the program broadcasted by the television system.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for automatically controlling audio output of a television system that includes a television device, the television device being connected to an input signal source and including a processor, an ambient sound monitoring unit, and an audio output unit, the method being implemented using the processor of the television device and comprising the steps of:
   in response to receipt of a source signal from the input signal source, controlling the audio output unit to output an audio signal extracted from the source signal;
   activating the ambient sound monitoring unit so as to obtain ambient sound data;
   determining, based on at least the ambient sound data, whether the audio output needs to be adjusted; and
   when it is determined that the audio output needs to be adjusted, adjusting the audio signal based on at least the ambient sound data to generate an adjusted audio signal, and controlling the audio output unit to output the adjusted audio signal;
   wherein the television system further includes a depth camera mounted on the television device for capturing an image of a user; and
   wherein, determining whether the audio output needs to be adjusted is further based on one of:
     a distance between the television device and the remote control; and
     an estimated distance between the television device and the user, the estimated distance being obtained based on the image of the user.

2. The method of claim 1, the television system further including a remote control communicating with the television device, the ambient sound monitoring unit including a microphone mounted on the remote control, wherein, activating the ambient sound monitoring unit includes activating the microphone mounted on the remote control.

3. The method of claim 1, wherein adjusting the audio signal includes adjusting at least one of the following parameters:
   an overall volume of the audio signal;
   a volume of bass sound of the audio signal;
   a volume of treble sound of the audio signal; and at least one parameter used in a filter included in a sound equalizer implemented by the processor.

4. The method of claim 1, the television system further including a program monitoring unit that is connected to the input signal source for receiving program metadata from the source signal, wherein:
determining whether the audio output needs to be adjusted includes extracting at least a genre of a program from the program metadata, and determining whether the audio output needs to be adjusted further based on the genre of the program; and
adjusting the audio signal is implemented further based on the genre of the program.

5. The method of claim 1, the television system further including a data storage storing a user profile, wherein:
determining whether the audio output needs to be adjusted includes accessing a sound preference of the user profile stored in the data storage, and determining whether the audio output needs to be adjusted further based on the sound preference; and
adjusting the audio signal is implemented further based on the sound preference.

6. The method of claim 1, the television system further including an input signal monitoring unit for obtaining an energy level of the source signal, wherein, determining whether the audio output needs to be adjusted is implemented further based on the energy level of the source signal and a current output setting of the audio signal, the current output setting including at least a current output volume.

7. The method of claim 1, wherein adjusting the audio signal includes generating a noise cancellation signal based on the ambient sound data, and combining the noise cancellation signal and the audio signal for generating the adjusted audio signal.

8. A method for automatically controlling audio output of a television system that includes a television device, the television device being connected to an input signal source and including a processor, an ambient sound monitoring unit, and an audio output unit, the method being implemented using the processor of the television device and comprising the steps of:
in response to receipt of a source signal from the input signal source, controlling the audio output unit to output an audio signal extracted from the source signal;
activating the ambient sound monitoring unit so as to obtain ambient sound data;
determining, based on at least the ambient sound data, whether the audio output needs to be adjusted; and
when it is determined that the audio output needs to be adjusted, adjusting the audio signal based on at least the ambient sound data to generate an adjusted audio signal, and controlling the audio output unit to output the adjusted audio signal,
wherein:
determining whether the audio output needs to be adjusted includes
extracting a dialog component from the audio signal, and
determining whether a condition for dialog enhancement has been met;
when it is determined that the condition for dialog enhancement has been met, the calculating the adjusted audio signal includes
generating an enhanced dialog component based on the dialog component, and
replacing the dialog component by the enhanced dialog component for generating the adjusted audio signal.

9. A television system comprising:
a television device that is connected to an input signal source and that includes a processor, an ambient sound monitoring unit, and an audio output unit, wherein said processor is configured to:
in response to receipt of a source signal from the input signal source, control said audio output unit to output an audio signal extracted from the source signal;
activate said ambient sound monitoring unit so as to obtain ambient sound data;
determine, based on at least the ambient sound data, whether the audio output needs to be adjusted; and
when it is determined that the audio output needs to be adjusted, adjust the audio signal based on at least the ambient sound data, to generate an adjusted audio signal, and control said audio output unit to output the adjusted audio signal,
a remote control communicating with said television device, and a depth camera mounted on said television device for capturing an image of a user, said ambient sound monitoring unit including a microphone mounted on said remote control,
wherein:
said processor is configured to activate said ambient sound monitoring unit by activating said microphone mounted on said remote control; and
said processor is configured to determine whether the audio output needs to be adjusted further based on one of
a distance between said television device and said remote control, and
an estimated distance between said television device and the user, the estimated distance being obtained based on the image of the user.

10. The television system of claim 9, wherein said processor is configured to adjust of the audio signal by adjusting at least one of the following parameters:
an overall volume of the audio signal;
a volume of bass sound of the audio signal;
a volume of treble sound of the audio signal; and
at least one parameter used in a filter included in a sound equalizer implemented by said processor.

11. The television system of claim 9, further comprising a program monitoring unit that is connected to the input signal source for receiving program metadata from the source signal, wherein:
said processor is configured to determine whether the audio output needs to be adjusted by extracting at least a genre of a program from the program metadata, and adjusting the audio signal further based on the genre of the program.

12. The television system of claim 9, further comprising a data storage storing user profile, wherein:
said processor is configured to determine whether the audio output needs to be adjusted by accessing a sound preference of the user profile stored in said data storage, and adjusting the audio signal further based on the sound preference.

13. The television system of claim 9, further comprising by an input signal monitoring unit for obtaining an energy level of the source signal, wherein:
said processor is configured to determine whether the audio output needs to be adjusted further based on the energy level of the source signal and a current output setting of the audio signal, and the current output setting includes at least a current output volume.

* * * * *